US012104763B2

(12) United States Patent
Kim

(10) Patent No.: US 12,104,763 B2
(45) Date of Patent: Oct. 1, 2024

(54) INNER LENS AND LAMP INCLUDING THE SAME

(71) Applicant: HYUNDAI MOBIS CO., LTD., Seoul (KR)

(72) Inventor: Chul Hyun Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/347,330

(22) Filed: Jul. 5, 2023

(65) Prior Publication Data

US 2024/0200751 A1 Jun. 20, 2024

(30) Foreign Application Priority Data

Dec. 20, 2022 (KR) ........................ 10-2022-0179136

(51) Int. Cl.

*F21S 43/40* (2018.01)
*F21S 43/245* (2018.01)
*F21S 43/247* (2018.01)
*F21S 43/31* (2018.01)

(52) U.S. Cl.

CPC ............. *F21S 43/40* (2018.01); *F21S 43/245* (2018.01); *F21S 43/247* (2018.01); *F21S 43/315* (2018.01)

(58) Field of Classification Search

CPC ....... F21S 43/245; F21S 43/247; F21S 43/315
See application file for complete search history.

(56) References Cited

U.S. PATENT DOCUMENTS

| | | | | |
|---|---|---|---|---|
| 7,270,454 | B2 * | 9/2007 | Amano | F21V 5/04 362/330 |
| 7,290,906 | B2 | 11/2007 | Suzuki et al. | |
| 7,470,042 | B2 * | 12/2008 | Ayabe | G02B 17/086 362/348 |
| 8,109,664 | B2 * | 2/2012 | Nakada | F21S 43/14 362/555 |
| 11,396,989 | B2 | 7/2022 | Kang et al. | |
| 2004/0141323 | A1 * | 7/2004 | Aynie | F21S 43/245 362/308 |
| 2005/0152153 | A1 | 7/2005 | Amano | |
| 2010/0259153 | A1 * | 10/2010 | Futami | F21S 43/247 313/114 |
| 2021/0001942 | A1 * | 1/2021 | Yamada | F21S 43/247 |

FOREIGN PATENT DOCUMENTS

| | | | |
|---|---|---|---|
| DE | 102011051978 | A1 | 1/2013 |
| EP | 2211087 | A2 | 7/2010 |
| JP | 2019185996 | A | 10/2019 |
| JP | 6823439 | B2 | 2/2021 |

OTHER PUBLICATIONS

Extended European search report issued Jun. 4, 2024 in corresponding European patent application No. 23183545.5.

* cited by examiner

Primary Examiner — Eric T Eide
(74) *Attorney, Agent, or Firm* — NovoTechIP International PLLC

(57) ABSTRACT

Disclosed is an inner lens provided in a lamp, the inner lens including a light transmission part through which at least a portion of a light beam output from a light source passes and is then output, a light distribution formation part that outputs, to an outside of the lamp, a light beam, which forms a light distribution pattern, within a transmission light beam that is the light beam output from the light transmission part, and an image formation part that outputs, to the outside, a light beam, which forms an image pattern, among the transmission light beam.

19 Claims, 4 Drawing Sheets

INNER LENS AND LAMP INCLUDING THE SAME

CROSS-REFERENCE TO RELATED APPLICATIONS

This application claims the benefit of priority to Korean Patent Application No. 10-2022-0179136, filed in the Korean Intellectual Property Office on Dec. 20, 2022, the entire contents of which are incorporated herein by reference.

TECHNICAL FIELD

The present disclosure relates to an inner lens and a lamp including the same.

BACKGROUND

In general, a rear lamp provided on a rear side of a vehicle serves to provide information to an outside person. Examples of the rear lamp include a brake light that is turned on when a driver steps on a brake, a turn indicator that may repeatedly flash to notify a left turn or a right turn of the vehicle to the outside, a tail light that may notify the presence of a vehicle of a driver to an occupant in another vehicle positioned behind the vehicle of the driver in a dark tunnel, and the like. Meanwhile, such a rear lamp requires a function for forming a light distribution that satisfies the law, and in recent years, interest in not only a function of the rear lamp but also a design of the rear lamp for enhancing aesthetics is increasing.

In the lamp according to the related art, a functional component for implementing a function required for the rear lamp and a design component for implementing the design of the rear lamp have been separately provided. In this way, when the functional component and the design component are provided separately, a structure of the lamp is complicated, and at the same time, the cost required for manufacturing is increased.

Accordingly, in recent years, interest in a lamp in which the functional component and the design component are integrated so that the function and the design required for the rear lamp may be simultaneously implemented has been continuously increased.

SUMMARY

The present disclosure has been made to solve the above-mentioned problems occurring in the prior art while advantages achieved by the prior art are maintained intact.

An aspect of the present disclosure provides a lamp including an inner lens in which a function component and a design component are integrated to form a light distribution that satisfies regulations, and at the same time, implement a design that enhances aesthetics, and thus a structure thereof is simplified.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, there is provided an inner lens provided in a lamp, the inner lens including a light transmission part through which at least a portion of a light beam output from a light source passes and is then output, a light distribution formation part that outputs, to an outside of the lamp, a light beam, which forms a light distribution pattern, among a transmission light beam that is the light beam output from the light transmission part, and an image formation part that outputs, to the outside, a light beam, which forms an image pattern, among the transmission light beam.

Further, an inner lens may be provided in which, when a portion of the transmission light beam is referred to as a first transmission light beam, and the other thereof is referred to as a second transmission light beam, the light distribution formation part may include a first light distribution formation portion through which the first transmission light beam is input and passes, is then output to the outside, and forms a first light distribution pattern, and the image formation part may include a light guide into which the second transmission light beam is input and which extends in a guide direction offset from an output direction that is a direction in which a light beam is output from the first light distribution formation portion and guides progress of the input second transmission light beam in the guide direction.

Further, an inner lens may be provided in which the first transmission light beam may be diffused in a first light distribution output area that is an area, through which the first transmission light beam is output, among the first light distribution formation portion.

Further, an inner lens may be provided in which the first light distribution formation portion may include an extension area extending between the first light distribution output area and the light guide in the output direction, and the extension area may be corrosion-treated to scatter at least a portion of the first transmission light beam passing through the light transmission part.

Further, an inner lens may be provided in which the extension area may have a vertically tapered shape, of which a width in a vertical direction becomes narrower as it goes in the output direction.

Further, an inner lens may be provided in which the light guide may totally reflect the input second transmission light beam.

Further, an inner lens may be provided in which an image optic that reflects, toward the outside, an image formation light beam that is a portion of the input second transmission light beam so as to form the image pattern may be formed in the light guide.

Further, an inner lens may be provided in which, when a direction perpendicular to the output direction is referred to as a vertical direction, the guide direction may be defined as a direction inclined toward the output direction as a distance from the light transmission part in the vertical direction increases, and the image optic may be provided as a plurality of image optics, which are spaced apart from each other in the guide direction.

Further, an inner lens may be provided in which each of the plurality of image optics may have a shape recessed from a side of the light guide, opposite to the output direction, toward the output direction.

Further, an inner lens may be provided in which the light distribution formation part may include a second light distribution formation portion through which a pattern formation light beam that is the other portion of the second transmission light beam is input, passes, and is then output to the outside and which thus forms a second light distribution pattern, and the light guide may include a first light guide that extends between the light transmission part and the second light distribution formation portion and guides the pattern formation light beam to the second light distribution formation portion.

Further, an inner lens may be provided in which a light distribution reflection optic that reflects the pattern formation light beam to the outside may be formed in an input area that is an area, into which the pattern formation light beam guided by the light guide is input, among the second light distribution formation portion.

Further, an inner lens may be provided in which the pattern formation light beam reflected by the light distribution reflection optic may be diffused in a second light distribution output area that is an area, from which the pattern formation light beam reflected by the light distribution reflection optic is output, among the second light distribution formation portion.

Further, an inner lens may be provided in which the input area may be formed on a side of the second light distribution formation portion in an opposite direction to the output direction, and the second light distribution output area may be formed on a side of the second light distribution formation portion in the output direction.

Further, an inner lens may be provided in which the light guide may further include a second light guide disposed above the first light guide, the first light guide may be disposed below the first light distribution formation portion and may be disposed above the second light distribution formation portion, and the second light guide may be disposed above the first light distribution formation portion.

Further, an inner lens may be provided in which a separation distance between the first light guide and the second light guide in the vertical direction may increase in the output direction.

Further, an inner lens may be provided in which the light transmission part may include a first light transmission portion from which the first transmission light beam input into the first light distribution formation portion is output and which faces a first light distribution output area that is an area, from which the first transmission light beam is output, among the first light distribution formation portion.

Further, an inner lens may be provided in which a transmission optic that guides the first transmission light beam to the first light distribution output area may be formed in the first light transmission portion.

Further, an inner lens may be provided in which the light transmission part may further include a second light transmission portion from which the second transmission light beam is output toward the light guide and which extends from the first light transmission portion in a direction opposite to the output direction.

Further, an inner lens may be provided in which the second light transmission portion may be corrosion-treated to scatter at least a portion of the light beam output from the light source.

According to another aspect of the present disclosure, there is provided a lamp including a light source from which a light beam is output, and an inner lens into which the light beam output from the light source is input, wherein the inner lens includes a light transmission part through which at least a portion of the light beam output from the light source passes and is then output, a light distribution formation part that outputs, to an outside, a light beam, which forms a light distribution pattern, among a transmission light beam that is the light beam output from the light transmission part, and an image formation part that outputs, to the outside, a light beam, which forms an image pattern, among the transmission light beam.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
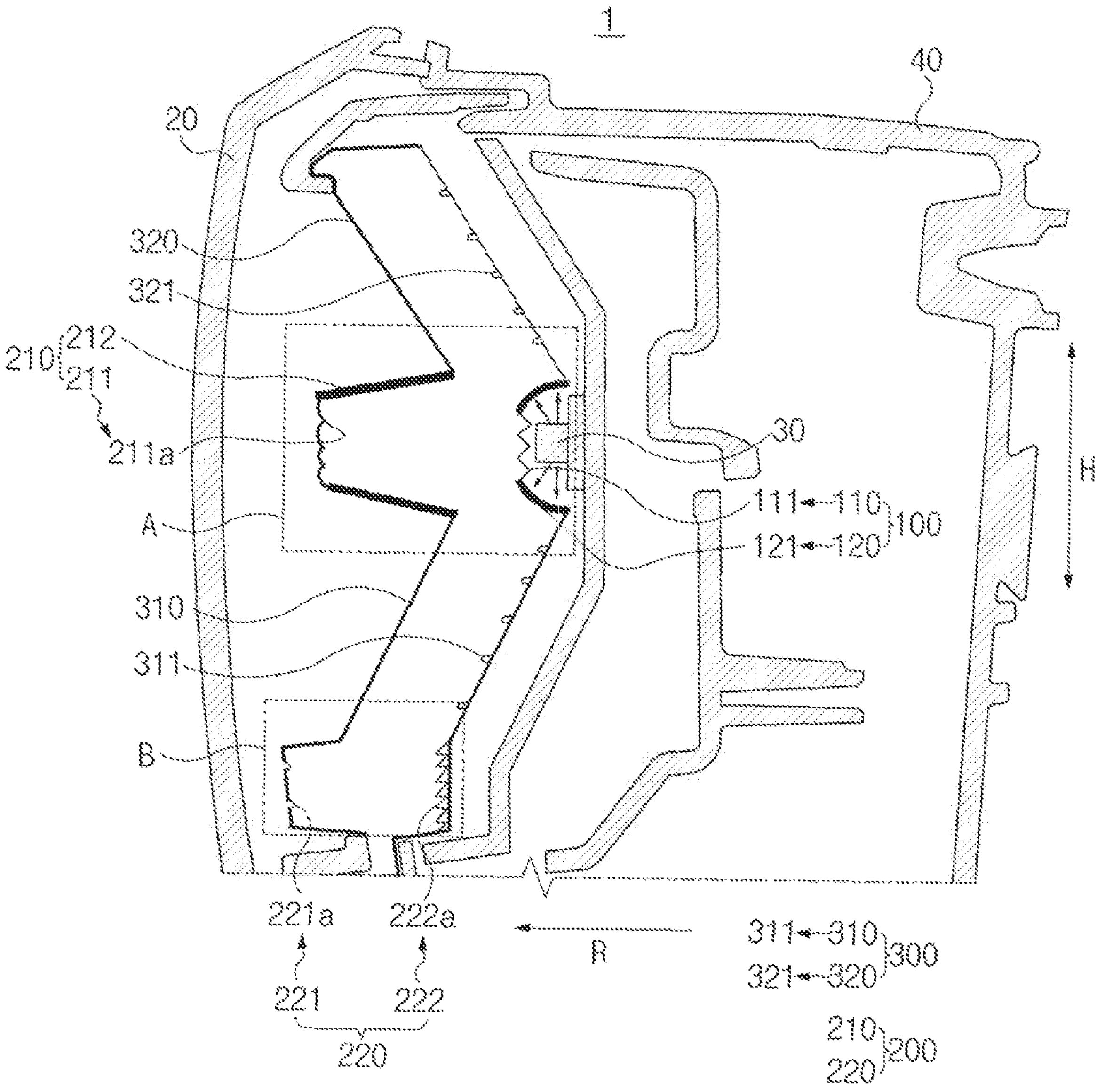
FIG. 1 is a longitudinal sectional view of a lamp according to the present disclosure.

Hereinafter, some embodiments of the present disclosure will be described in detail with reference to the exemplary drawings. In adding reference numerals to components of each drawing, it should be noted that identical or equivalent components are designated by an identical numeral even when they are displayed on other drawings. Further, in describing the embodiment of the present disclosure, a detailed description of the related known configuration or function will be omitted when it is determined that it interferes with the understanding of the embodiment of the present disclosure.

Further, in the description of components of the embodiments of the present disclosure, the terms such as first, second, A, B, (a) and (b) may be used. These terms are merely intended to distinguish one component from other components, and the terms do not limit the nature, order, or sequence of the components. When it is described that one component "is input into", "passes through", or "is output from" another component, the component may be directly input into, directly pass through, or be directly output from the other component, but a third component may be input, pass, or be output between the components.

Hereinafter, a lamp 1 according to the present disclosure will be described with reference to the accompanying drawings.

The lamp 1, according to the present disclosure, may provide information to an outside person. As an example, the lamp 1 may be a rear lamp provided behind a vehicle. Referring to FIG. 1, the lamp 1 may include an inner lens 10, an outer lens 20, a light source 30, and a housing 40.

A light beam output from the light source 30 may be input into, pass through, and be then output from the inner lens 10. The light beam output from the inner lens 10 may form a light distribution pattern and an image pattern. The light distribution pattern may mean a pattern light beam having light properties that satisfy regulations. The image pattern may mean a pattern light beam providing aesthetics to a person who looks at the lamp 1. Such an image pattern may be designed by a user to have various shapes. The inner lens 10 may include a light transmission part 100, a light distribution formation part 200, and an image formation part 300.

The light beam output from the light source 30 may be input into the light transmission part 100. The light transmission part 100 may output at least a portion of the input light beam. The light beam output from the light transmission part 100 may be named a transmission light beam. The light transmission part 100 may be disposed to surround the light source 30. The light transmission part 100 may include a first light transmission portion 110 and a second light transmission portion 120.

The light beam input into a first light distribution formation portion 210, which will be described below, may be output from the first light transmission portion 110. The light beam output from the first light transmission portion 110 may be a portion of the transmission light beam. The portion of the transmission light beam may be named a first transmission light beam. The first light transmission portion 110 may be disposed to face a first light distribution output area 211, which will be described below. Further, the first light transmission portion 110 may be disposed to face a surface of the light source 30 in an output direction “R.” A transmission optic 111 may be formed in the first light transmission portion 110.

The transmission optic 111 may guide the first transmission light beam to the first light distribution output area 211. The transmission optic 111 may be formed on an area, through which the first transmission light beam is output, among the first light transmission portion 110. The transmission optic 111 may have a concavo-convex shape protruding in a direction opposite to the output direction “R.” The output direction “R” may be defined as a direction in which the light beam is output from the first light distribution formation portion 210. The output direction “R” may be understood as a rearward direction. Further, the direction opposite to the output direction “R” may be named an opposite output direction and may be understood as a forward direction.

The transmission optic 111 may be provided as a plurality of transmission optics 111. The plurality of transmission optics 111 may be arranged in a vertical direction “H.” The vertical direction “H” may be defined as a direction perpendicular to the output direction “R.” The vertical direction “H” may be understood as a concept including an up-down direction. A corrosion-treated area may be provided between adjacent two transmission optics 111 among the plurality of transmission optics 111. At least a portion of the light beam output from the light source 30 may be scattered in the corrosion-treated area provided between the adjacent two transmission optics 111.

The light beam input into the image formation part 300 may be output from the second light transmission portion 120. The light beam output from the second light transmission portion 120 may be the other portion of the transmission light beam. The other portion of the transmission light beam may be named a second transmission light beam. The second light transmission portion 120 may guide the light beam output from the light source 30 to the image formation part 300.

The second light transmission portion 120 may extend from the first light transmission portion 110 in the opposite output direction. The second light transmission portion 120 may have a convex shape in a guide direction. The guide direction may be defined as a direction inclined in the output direction “R” with respect to the vertical direction “H.” For example, the guide direction may be defined as a direction inclined toward the output direction “R” with respect to a direction away from the light transmission part 100 in the vertical direction “H.” The guide direction may include a first guide direction and a second guide direction, which will be described below. Based on FIG. 1, the first guide direction may be understood as a direction toward a lower left side, and the second guide direction may be understood as a direction toward an upper left side. A transmission corrosion area 121 may be provided in the second light transmission portion 120.

The transmission corrosion area 121 may be defined as a corrosion-treated portion of the second light transmission portion 120. The transmission corrosion area 121 may scatter at least a portion of the light beam output from the light source 30.

Figure 2:
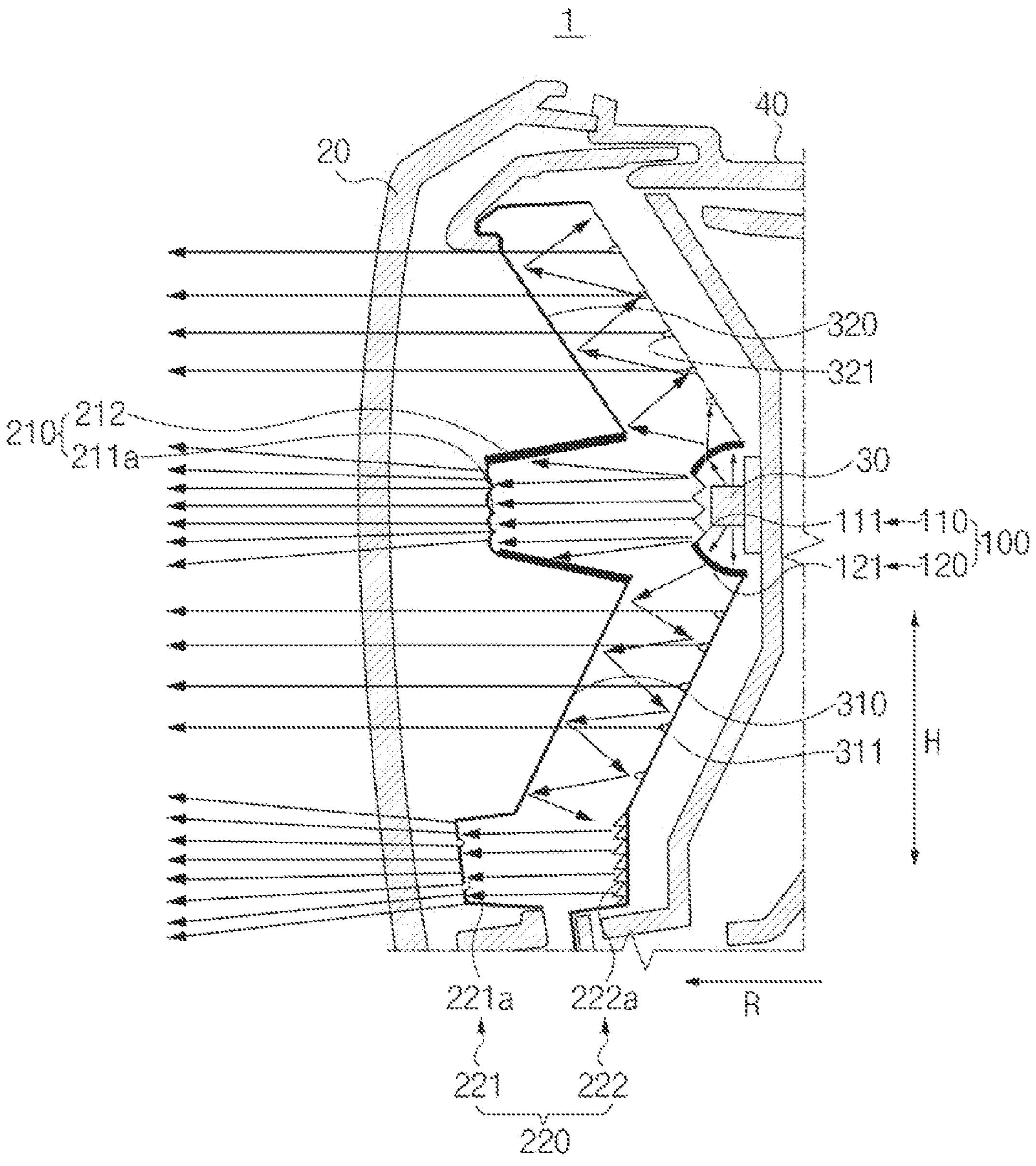
FIG. 2 is a longitudinal cross-sectional view of the lamp illustrating an optical path of a light beam output from a light source according to the present disclosure.

Further referring to FIG. 2, the transmission light beam output from the light transmission part 100 may be input into, pass through, and be then output from the light distribution formation part 200. The light beam output from the light distribution formation part 200 may form a light distribution pattern. Such a light distribution pattern may include a first light distribution pattern and a second light distribution pattern, which will be described below. The light distribution formation part 200 may include the first light distribution formation portion 210 and a second light distribution formation portion 220.

Figure 3:
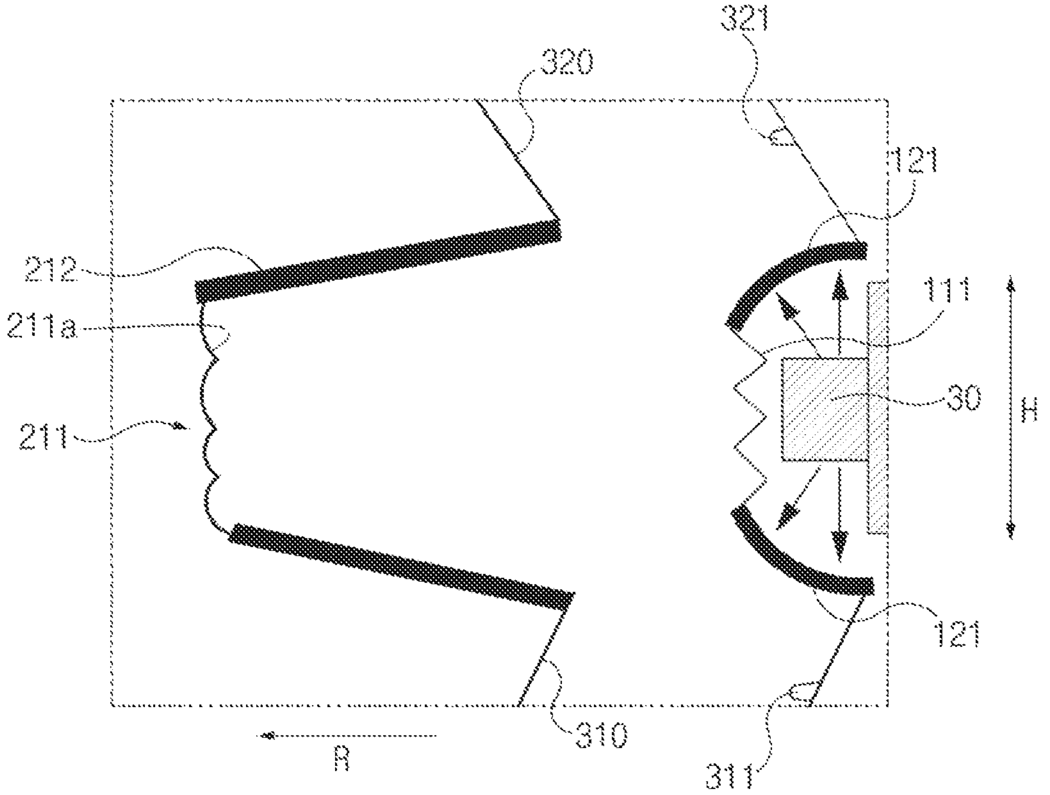
FIG. 3 is an enlarged view of part "A" illustrated in FIG. 1.

Further referring to FIG. 3, the first transmission light beam may be input into, pass through, and be then output from the first light distribution formation portion 210. For example, the first transmission light beam output from the first light distribution formation portion 210 may pass through the outer lens 20 and may then be output externally (i.e., to the outside) of the lamp 1. The light beam output from the first light distribution formation portion 210 may form a first light distribution pattern. As an example, the first light distribution formation portion 210 may be disposed above the second light distribution formation portion 220. The first light distribution formation portion 210 may be named an “upper light distribution formation portion.” The first light distribution formation portion 210 may include the first light distribution output area 211 and an extension area 212.

The first light distribution output area 211 may be defined as an area from which the first transmission light beam is output. The first light distribution output area 211 may extend in the vertical direction “H.” The first light distribution output area 211 may be disposed from the image formation part 300 in the output direction “R”. The first transmission light beam output from the first light distribution output area 211 may be diffused in the vertical direction “H.” The first light distribution output area 211 may be provided with a first light distribution optic. The first light distribution optic may have a convex shape in the output direction “R.” The first light distribution optic may be arranged as a plurality of first light distribution optics in the vertical direction “H.” A first light distribution corrosion area **211*a*** may be provided between the two adjacent first light distribution optics among the first light distribution optics.

The first light distribution corrosion area **211*a* may be defined as a corrosion-treated portion of the first light distribution output area 211. The first light distribution corrosion area 211*a* may scatter the first transmission light beam. The first light distribution corrosion area 211*a* may be provided as a plurality of first light distribution corrosion areas 211*a*. The plurality of first light distribution corrosion areas 211*a*** and the plurality of first light distribution optics may be alternately arranged in the vertical direction “H.”

The extension area 212 may extend between the first light distribution output area 211 and the image formation part 300 in the output direction “R.” The extension area 212 may have a shape, of which the width in the vertical direction “H” becomes narrower as it goes in the output direction “R.” The extension area 212 may be corrosion-treated. The corrosion-treated extension area 212 may scatter at least a portion of the first transmission light beam.

Figure 4:
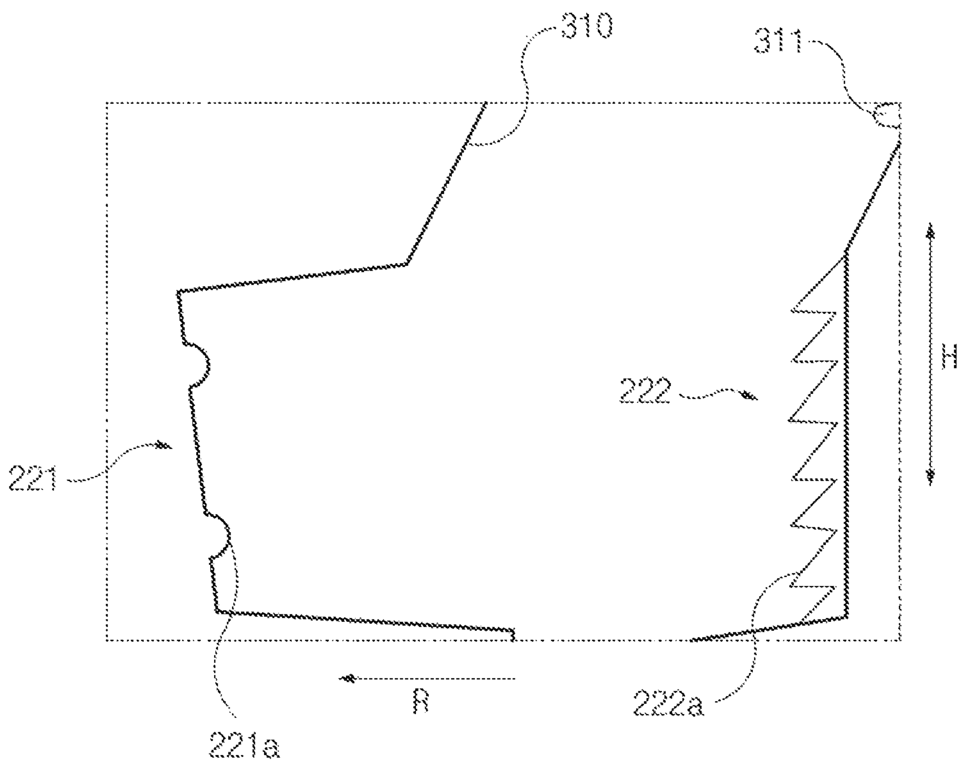
FIG. 4 is an enlarged view of part "B" illustrated in FIG. 1.

Further referring to FIG. 4, a pattern formation light beam among the second transmission light beam may be input into, pass through, and be then output from the second light distribution formation portion 220. A portion of the second transmission light beam may be named an image formation light beam input into the image formation part 300, and the other portion of the second transmission light beam may be named a pattern formation light beam input into the second light distribution formation portion 220. The pattern formation light beam may be a portion of a light beam input into a first light guide 310, which will be described below, among the second transmission light beam. The pattern formation light beam may be a light beam transmitting the second light transmission portion 120 and passing through the first light guide 310. Further, the image formation light beam may include a first image formation light beam and a second image formation light beam. The first image formation light beam may be defined as a light beam which is input into the first light guide 310, is substantially entirely reflected by a first image optic 311, which will be described below, and is then output to the outside of the lamp 1 in the output direction "R." Further, the second image formation light beam may be defined as a light beam which is input into a second light guide 320, is substantially entirely reflected by a second image optic 321, which will be described below, and is then output to the outside of the lamp 1 in the output direction "R."

The pattern formation light beam output from the second light distribution formation portion 220 may pass through the outer lens 20 and may be then output to the outside of the lamp 1. The light beam output from the second light distribution formation portion 220 may form a second light distribution pattern. The second light distribution formation portion 220 may be named a "lower light distribution formation portion." The second light distribution formation portion 220 may include a second light distribution output area 221 and an input area 222.

The second light distribution output area 221 may be defined as an area from which the pattern formation light beam is output. The second light distribution output area 221 may form a side of the second light distribution formation portion 220 in the output direction "R." The second light distribution output area 221 may extend in the vertical direction "H." The pattern formation light beam output from the second light distribution output area 221 may be diffused in the vertical direction "H." The second light distribution output area 221 may be provided with a plurality of second light distribution optics.

The plurality of second light distribution optics may be arranged spaced apart from each other in the vertical direction "H." A second light distribution corrosion area 221*a* may be provided between the two adjacent second light distribution optics among the second light distribution optics.

The second light distribution corrosion area 221*a* may be defined as a corrosion-treated portion of the second light distribution output area 221. The second light distribution corrosion area 221*a* may scatter the pattern formation light beam. The second light distribution corrosion area 221*a* may be provided as a plurality of second light distribution corrosion areas 221*a*. The plurality of second light distribution corrosion areas 221*a* and the plurality of second light distribution optics may be alternately arranged in the vertical direction "H."

The light beam having passed through the first light guide 310 may be input into the input area 222. The input area 222 may form a side of the second light distribution formation portion 220 in the opposite output direction. For example, the input area 222 may be disposed on a side of the second light distribution output area 221 in the opposite output direction. A light distribution reflection optic 222*a* may be formed in the input area 222.

The light distribution reflection optic 222*a* may reflect, toward the second light distribution output area 221, the pattern formation light beam having passed through the first light guide 310. The light distribution reflection optic 222*a* may have a concavo-convex shape protruding in the output direction "R." The light distribution reflection optic 222*a* may be provided as a plurality of light distribution reflection optics 222*a*. The plurality of light distribution reflection optics 222*a* may be arranged in the vertical direction "H."

The image formation part 300 may output the light beam forming the image pattern to the outside of the lamp 1. The image pattern may include a first image pattern and a second image pattern, which will be described below. The image formation part 300 may include the light guides 310 and 320. The light guides 310 and 320 may guide progress of the second transmission light in a guide direction. The second transmission light beam input into the light guides 310 and 320 may be substantially entirely reflected inside the light guides 310 and 320. The light guides 310 and 320 may include the first light guide 310 and the second light guide 320.

The first image formation light beam and the pattern formation light beam among the second transmission light beam may be input into the first light guide 310. The first light guide 310 may guide progress of the pattern formation light beam to the second light distribution formation portion 220 in the first guide direction. The light input into the first light guide 310 may be substantially entirely reflected inside the first light guide 310. The first light guide 310 may extend from a lower end of each of the first light distribution formation portion 210 and the second light transmission portion 120 in the first guide direction. The first image optic 311 may be formed in the first light guide 310.

The first image optic 311 may reflect the first image formation light beam toward the outside of the lamp 1 so as to form the first image pattern. In other words, the first image optic 311 may guide progress of the first image formation light beam to the outside of the lamp 1 in the output direction "R." The first image optic 311 may be formed on a side of the first light guide 310 in the opposite output direction. Further, the first image optic 311 may have a concavo-convex shape protruding in the output direction "R." Further, the first image optic 311 may be corrosion-treated. For example, the corrosion-treated first image optic 311 may scatter the first image formation light beam.

The first image optic 311 may be provided as a plurality of first image optics 311. The plurality of first image optics 311 may be arranged spaced apart from each other in the first guide direction. The first image pattern may be three-dimensionally observed by the outside person outside the lamp 1 through the plurality of first image optics 311. In other words, the plurality of first image optics 311 may enhance the aesthetics felt by the person who looks at the lamp 1.

The second image formation light beam and an extinction light beam among the second transmission light beam may be input into the second light guide 320. The extinction light beam may be defined as a light beam, which is not output to the outside of the lamp 1, among the light input into the second light guide 320. In summary, the second transmission light beam may be understood as a concept including the pattern formation light beam, the first image formation light beam, the second image formation light beam, and the extinction light beam. Furthermore, the pattern formation light beam and the first image formation light beam may be input into the first light guide 310, and the second image formation light beam and the extinction light beam may be input into the second light guide 320.

The light input into the second light guide 320 may be substantially entirely reflected inside the second light guide 320. The second light guide 320 may extend from an upper end of each of the first light distribution formation portion 210 and the second light transmission portion 120 in the second guide direction. Further, the second light guide 320 and the first light guide 310 may be spaced apart from each other in the vertical direction "H." For example, a separation distance between the second light guide 320 and the first light guide 310 in the vertical direction "H" may increase in the output direction "R." The second image optic 321 may be formed in the second light guide 320.

The second image optic 321 may reflect the second image formation light beam toward the outside of the lamp 1 so as to form the second image pattern. In other words, the second image optic 321 may guide progress of the second image formation light beam to the outside of the lamp 1 in the output direction "R."

The second image optic 321 may be formed on a side of the second light guide 320 in the opposite output direction. Further, the second image optic 321 may have a concavo-convex shape protruding in the output direction "R." Further, the second image optic 321 may be corrosion-treated. For example, the corrosion-treated second image optic 321 may scatter the second image formation light beam.

The second image optic 321 may be provided as a plurality of second image optics 321. The plurality of second image optics 321 may be arranged spaced apart from each other in the second guide direction. The second image pattern may be three-dimensionally observed by the outside person outside the lamp 1 through the plurality of second image optics 321. In other words, the plurality of second image optics 321 may enhance the aesthetics felt by the person who looks at the lamp 1. The light beam output from the inner lens 10 is input into, passes through, and is then output to the outside of the lamp 1 through the outer lens 20. The outer lens 20 may be disposed from the inner lens 10 in the output direction "R". For example, the outer lens 20 may form a rear side of the lamp 1.

The light source 30 may output the light beam toward the light transmission part 100. As an example, the light source 30 may be a light emitting diode (LED). In more detail, the light source 30 may be a 4 FLED. The 4 FLED may mean an LED in which light beams are output from four portions thereof. When the light source 30 is the 4 FLED, light may be output from four output surfaces (as an example, an upper surface, a lower surface, a left surface, and a right surface) perpendicular to the output direction "R" of the light source 30. However, the spirit of the present disclosure is not limited thereto, the number of output surfaces, from which the light beam may output, among the light source 30 may be five or more, and the light beam may also output from a side surface of the light source 30 in the output direction "R" and a side surface of the light source 30 in the opposite output direction. As an example, in the light source 30, the four output surfaces perpendicular to the output direction "R" may be arranged to face the second light transmission portion 120.

As an example, the light source 30 may be provided as a one light source 30. In more detail, the lamp 1, according to the present disclosure, may form both the light distribution pattern and the image pattern using the one light source 30. In this way, since both the light distribution pattern and the image pattern may be formed using only the one light source 30, the number of light sources 30 required for manufacturing the lamp 1 is minimized, and thus manufacturing cost of the lamp 1 is reduced.

The housing 40 together with the outer lens 20 may form the exterior of the lamp 1. The inner lens 10 and the light source 30 may be arranged inside the housing 40 and the outer lens 20. Further, the housing 40 may support the inner lens 10, the outer lens 20, and the light source 30.

A lamp according to the present disclosure is provided with an inner lens in which a function component and a design component are integrated to form a light distribution that satisfies regulations, and at the same time, implement a design that enhances aesthetics, and thus a structure thereof may be simplified, and cost thereof may be reduced.

Hereinabove, even though it has been described that all components constituting the embodiments of the present disclosure are combined into one part or are operated while combined with each other, the present disclosure is not necessarily limited to these embodiments. That is, all the components may be operated while selectively combined into one or more parts within the scope of the present disclosure. Further, terms such as "includes", "constitutes", or "have" described above mean that the corresponding component may be inherent unless otherwise stated, and thus should be construed as not excluding other components but further including other components. All terms including technical or scientific terms have the same meanings as those commonly understood by those skilled in the art to which the present disclosure pertains unless otherwise defined. The generally used terms defined in the dictionaries should be construed as having the meanings that coincide with the meanings of the contexts of the related technologies, and should not be construed as ideal or excessively formal meanings unless clearly defined in the present disclosure.

The above description is merely illustrative of the technical spirit of the present disclosure, and those skilled in the art to which the present disclosure belongs may make various modifications and changes without departing from the essential features of the present disclosure. Thus, the embodiments disclosed in the present disclosure are not intended to limit the technology spirit of the present disclosure, but are intended to describe the present disclosure, and the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

What is claimed is:

1. An inner lens for a lamp, comprising:

a light transmission part configured to receive at least a portion of a light beam output from a light source and transmit, to other parts of the inner lens, a transmission light beam including the received portion of the light beam;

a light distribution formation part configured to generate, based on the transmission light beam transmitted from the light transmission part, a first light beam having a light distribution pattern, and externally output the first light beam in a first direction; and an aesthetic image formation part configured to generate, based on the transmission light beam transmitted from the light transmission part, a second light beam having an aesthetic image pattern, and externally output the second light beam, wherein the light distribution formation part includes a first light distribution formation portion extending in the first direction from the light transmission part to a first direction end portion of the first light distribution formation portion, wherein the aesthetic image formation part includes a plurality of image optics configured to externally reflect the transmission light beam transmitted from the light transmission part to form the aesthetic image pattern, wherein a first gap in the first direction between the light source and the first direction end portion of the first light distribution formation portion is greater than a second gap in the first direction between the light source and all of the plurality of image optics, and wherein the light transmission part comprises:

a first light transmission portion including a transmission optic configured to guide a first portion of the transmission light beam to the light distribution formation part; and a second light transmission portion that is corrosion-treated to scatter a second portion of the transmission light beam.

2. The inner lens of claim 1, wherein:

the transmission light beam comprises a first transmission light beam and a second transmission light beam, the first light distribution formation portion is configured to receive the first transmission light beam and externally output a first light distribution pattern, and the aesthetic image formation part includes a light guide extending in a guide direction offset from the first direction and configured to receive and guide the second transmission light beam in the guide direction.

3. The inner lens of claim 2, wherein the first transmission light beam is diffused in a first light distribution output area, through which the first transmission light beam is output, within the first light distribution formation portion.

4. The inner lens of claim 3, wherein:

the first light distribution formation portion includes an extension area extending between the first light distribution output area and the light guide in the first direction, and the extension area is corrosion-treated to scatter at least a portion of the first transmission light beam passing through the light transmission part.

5. The inner lens of claim 4, wherein the extension area has a vertically tapered shape.

6. The inner lens of claim 2, wherein the light guide is configured to reflect a substantially entire portion of the second transmission light beam.

7. The inner lens of claim 6, wherein:

the second transmission light beam includes first and second portions, the first portion including an image formation light beam, and the light guide includes the plurality of image optics configured to externally reflect the image formation light beam to form the aesthetic image pattern.

8. The inner lens of claim 7, wherein:

a direction perpendicular to the first direction is a second direction, the guide direction is a direction inclined in the first direction as a distance from the light transmission part in the second direction increases, and the plurality of image optics are spaced apart from each other in the guide direction.

9. The inner lens of claim 8, wherein each of the plurality of image optics has a shape recessed from a side of the light guide in the first direction.

10. The inner lens of claim 7, wherein:

the second portion of the second transmission light beam includes a pattern formation light beam, the light distribution formation part includes a second light distribution formation portion configured to receive the pattern formation light beam and externally output a second light distribution pattern, and the light guide includes a first light guide extending between the light transmission part and the second light distribution formation portion and configured to guide the pattern formation light beam toward the second light distribution formation portion.

11. The inner lens of claim 10, wherein a light distribution reflection optic configured to reflect the pattern formation light beam to an outside is formed in an input area into which the pattern formation light beam guided by the light guide is input, within the second light distribution formation portion.

12. The inner lens of claim 11, wherein the pattern formation light beam reflected by the light distribution reflection optic is diffused in a second light distribution output area, from which the pattern formation light beam reflected by the light distribution reflection optic is output, within the second light distribution formation portion.

13. The inner lens of claim 12, wherein:

the input area is formed on a side of the second light distribution formation portion in a direction opposite to the first direction, and the second light distribution output area is formed on a side of the second light distribution formation portion in the first direction.

14. The inner lens of claim 10, wherein:

the light guide further includes a second light guide disposed above the first light guide, the first light guide is disposed below the first light distribution formation portion and above the second light distribution formation portion, and the second light guide is disposed above the first light distribution formation portion.

15. The inner lens of claim 14, wherein a separation distance between the first light guide and the second light guide in a second direction increases in the first direction, the second direction being perpendicular to the first direction.

16. The inner lens of claim 2, wherein:

the first transmission light beam is transmitted into the first light distribution formation portion from the first light transmission portion, and the first light transmission portion faces a first light distribution output area of the first light distribution formation portion, through which the first transmission light beam is output from the first light distribution formation portion.

17. The inner lens of claim 16, wherein:

the second transmission light beam is transmitted from the second light transmission portion toward the light guide, and the second light transmission portion extends from the first light transmission portion in a direction opposite to the first direction.

18. An inner lens for a lamp, comprising:

a light transmission part configured to receive at least a portion of a light beam output from a light source and transmit, to other parts of the inner lens, a transmission light beam including the received portion of the light beam;

a light distribution formation part configured to generate, based on the transmission light beam transmitted from the light transmission part, a first light beam having a light distribution pattern, and externally output the first light beam in a first direction; and an aesthetic image formation part configured to generate, based on the transmission light beam, transmitted from the light transmission part, a second light beam having an aesthetic image pattern, and externally output the second light beam, wherein the light distribution formation part includes a first light distribution formation portion extending in the first direction from the light transmission part to a first direction end portion of the first light distribution formation portion, wherein the aesthetic image formation part includes a plurality of image optics configured to externally reflect the transmission light beam transmitted from the light transmission part to form the aesthetic image pattern, wherein a first gap in the first direction between the light source and the first direction end portion of the first light distribution formation portion is greater than a second gap in the first direction between the light source and all of the plurality of image optics, wherein the transmission light beam comprises a first transmission light beam and a second transmission light beam, wherein the first light distribution formation portion is configured to receive the first transmission light beam and externally output a first light distribution pattern, and wherein the aesthetic image formation part includes a light guide extending in a guide direction offset from the first direction and configured to receive and guide the second transmission light beam in the guide direction, wherein the light transmission part includes:

a first light transmission portion from which the first transmission light beam that is input into the first light distribution formation portion is output, which faces a first light distribution output area and from which the first transmission light beam is output within the first light distribution formation portion; and a second light transmission portion from which the second transmission light beam is output toward the light guide and which extends from the first light transmission portion in a direction opposite to the first direction, and wherein the second light transmission portion is corrosion-treated to scatter at least a portion of the light beam output from the light source.

19. A lamp comprising:

a light source configured to output a light beam; and an inner lens configured to receive the light beam output from the light source, wherein the inner lens includes:

a light transmission part configured to receive at least a portion of the light beam output from the light source and transmit, to other parts of the inner lens, a transmission light beam including the received portion of the light beam;

a light distribution formation part configured to generate, based on the transmission light beam transmitted from the light transmission part, a first light beam having a light distribution pattern, and externally output the first light beam; and an aesthetic image formation part configured to generate, based on the transmission light beam transmitted from the light transmission part, and externally output a second light beam having an aesthetic image pattern, and externally outputting the second light beam, wherein the light distribution formation part includes a first light distribution formation portion extending in a first direction from the light transmission part to a first direction end portion of the first light distribution formation portion, wherein the aesthetic image formation part includes a plurality of image optics configured to externally reflect the transmission light beam transmitted from the light transmission part to form the aesthetic image pattern, wherein a first gap in the first direction between the light source and the first direction end portion of the first light distribution formation portion is greater than a second gap in the first direction between the light source and all of the plurality of image optics, and wherein the light transmission part comprises:

a first light transmission portion including a transmission optic configured to guide a first portion of the transmission light beam to the light distribution formation part; and a second light transmission portion that is corrosion-treated to scatter a second portion of the transmission light beam.

* * * * *